UNITED STATES PATENT OFFICE.

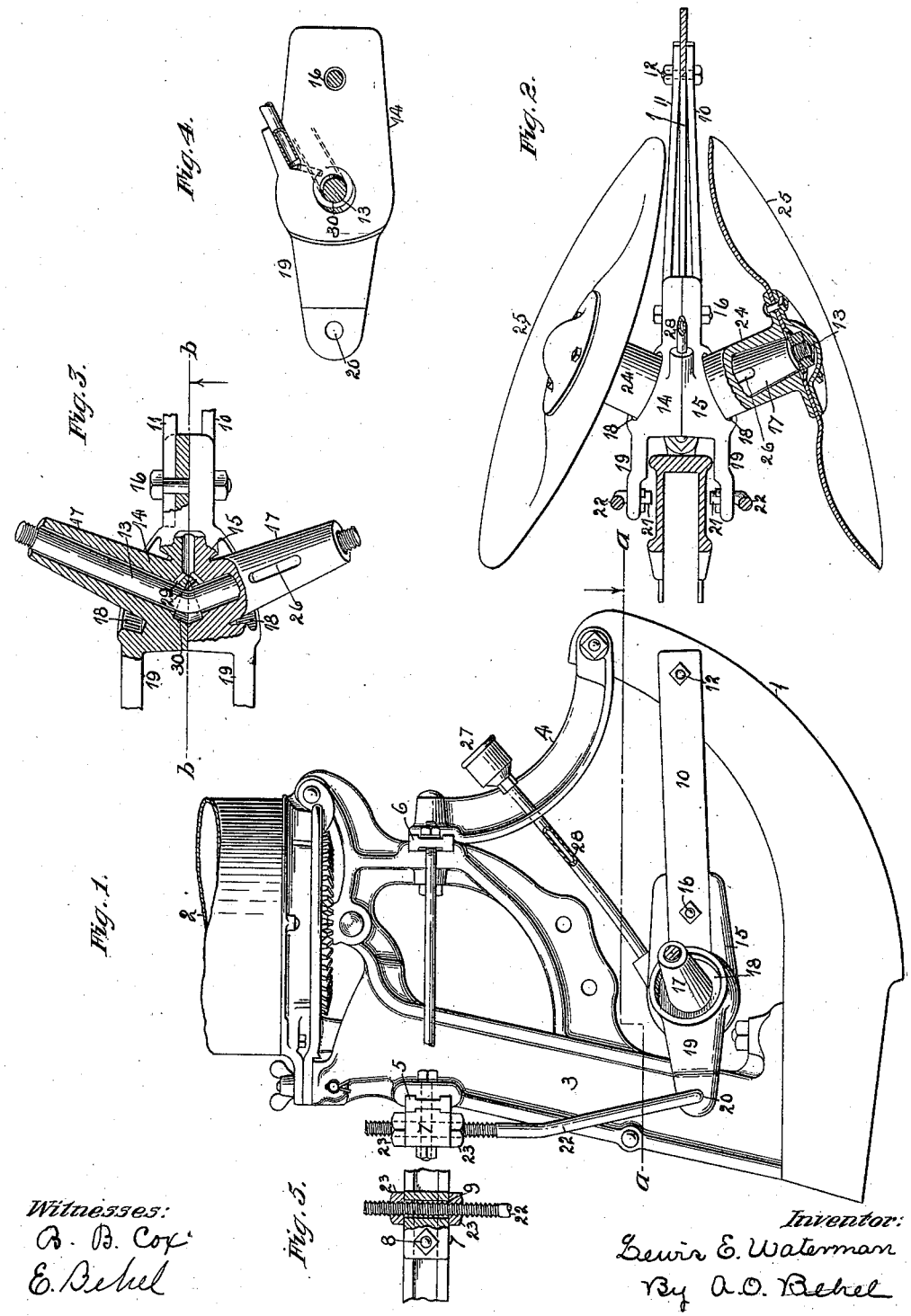

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CORN-PLANTER.

984,626.

Specification of Letters Patent.

Patented Feb. 21, 1911.

Application filed March 17, 1910. Serial No. 550,054.

*To all whom it may concern:*

Be it known that I, LEWIS E. WATERMAN, a citizen of the United States, residing at Rockford, in the county of Winnebago and State of Illinois, have invented certain new and useful Improvements in Corn-Planters, of which the following is a specification.

The object of this invention is to provide disk supplemental openers in connection with the main knife opener.

In the accompanying drawings, Figure 1 is a side elevation of the runner frame of a corn planter showing my improvements in connection therewith. Fig. 2 is a section on dotted line *a a* Fig. 1. Fig. 3 is a partial plan and section of the disk support. Fig. 4 is a section on dotted line *b b* Fig. 3. Fig. 5 is a rear face view of the bar 5 showing the block 7 in section.

In the drawing I have only shown so much of a corn-planter necessary to a proper understanding of my improvements in connection therewith.

The runner frame is of the usual construction comprising the knife opener 1 supporting the seed box 2 and seed dropping mechanism. The frame comprising the heel 3 and forward brace 4 connect the knife furrow opener with the seed box. The cross bars 5 and 6 connect the two end frames by connecting the heels 3 and forward braces 4 of the two frames. To the bar 5 are secured blocks 7 by the bolts 8, and through these blocks are formed vertical openings 9. To the forward portion of the knife furrow opener 1 are pivoted two bails 10 and 11 by the bolt 12.

A cranked rod 13 has its ends screw-threaded and is supported by the two-part housing 14 and 15 connected by the bolt 16. This bolt 16 also connects the rear ends of the bars 10 and 11 to the two-part housing. The two sections of this housing are each formed with a tubular axle 17 through which the cranked rod extends. A recess 18 is formed in the housing at the base of the axle. From each section of the housing extends an ear 19 formed with an opening 20 through which one end 21 of a rod 22 passes. The other ends of these rods 21 extend through the openings 9 in the block 7, and nuts 23, are placed in connection with the rod one against each side of the block 7. By means of these nuts 23 the rods 22 can be raised or lowered which will raise or lower the two-part housing and the axles supported thereby. Each axle 17 has a sleeve 24 located over it and is seated in the recess 18. To this sleeve 24 is bolted a disk 25. Each axle 17 is formed with a slot 26 through which oil may escape to the surfaces between the axle and sleeve. A grease cup 27 is connected to a tube 28 leading by the canals 29 to the space around the cranked rod 13, and into the center cavity 30 between the two sections 14 and 15. The axles 17 are so located with relation to the two-part housing that they extend forwardly and upwardly in order to bring the front edges of the disk close together so that the earth will be separated and turned outward. These disks are rotated by contacting with the earth as the planter is drawn forward.

I claim as my invention—

1. In a planter, the combination with a beam and an opener, of a bail comprising spaced bars pivoted to the front portion of the opener, a two-part housing secured to the bars and having angularly disposed axles, disks journaled on the axles, a block secured to the frame, spaced rods pivoted to the two-part housing and slidably engaging the block, and holding nuts adjustably threaded on the rods and bearing against the upper and under sides of the block.

2. In a planter, the combination with an opener frame having an upstanding heel, of a bail pivoted to the front end of the same, a housing carried by the pail and having rearwardly extending spaced ears that embrace the heel, and that are movable up and down thereon, angularly disposed disks journaled on opposite sides of the housing, and means for holding the bail and housing against pivotal movement.

3. In a planter, the combination with an opener frame, of an opener knife carried thereby, a two-part bail pivoted to the front end of the knife, a two-part housing secured to the rear ends of the two-part bail and having integral oppositely projecting axle boxes, an angular bolt passing through the boxes, disks journaled on the boxes, retaining devices for the disks secured to the ends of the bolt, an adjusting rod pivoted to the two-part housing and slidably engaged with the frame, and devices engaging the rod for holding the same in different positions.

In testimony whereof I have hereunto set my hand in presence of two subscribing witnesses.

LEWIS E. WATERMAN.

Witnesses:
A. O. BEHEL,
E. D. E. N. BEHEL.